US012109826B2

(12) United States Patent
Kuwabara et al.

(10) Patent No.: US 12,109,826 B2
(45) Date of Patent: Oct. 8, 2024

(54) PRINTER SYSTEM

(71) Applicant: Dai Nippon Printing Co., Ltd., Tokyo (JP)

(72) Inventors: Toshikazu Kuwabara, Tokyo (JP); Hiroaki Takano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 172 days.

(21) Appl. No.: 17/631,610

(22) PCT Filed: Sep. 25, 2020

(86) PCT No.: PCT/JP2020/036486
§ 371 (c)(1),
(2) Date: Jan. 31, 2022

(87) PCT Pub. No.: WO2021/060548
PCT Pub. Date: Apr. 1, 2021

(65) Prior Publication Data
US 2022/0274424 A1 Sep. 1, 2022

(30) Foreign Application Priority Data
Sep. 27, 2019 (JP) ................................ 2019-177773

(51) Int. Cl.
*B41J 3/60* (2006.01)
*B41J 2/325* (2006.01)
*B41J 3/42* (2006.01)

(52) U.S. Cl.
CPC ................ *B41J 3/60* (2013.01); *B41J 2/325* (2013.01); *B41J 3/42* (2013.01)

(58) Field of Classification Search
CPC ....... B41J 3/60; B41J 2/325; B41J 3/42; B41J 11/70
See application file for complete search history.

(56) References Cited

U.S. PATENT DOCUMENTS 9,205,674 B2 12/2015 Kamitani et al.
2014/0267477 A1 9/2014 Raming

FOREIGN PATENT DOCUMENTS

JP H01-262557 A 10/1989
JP 3952537 B2 * 8/2007 ................ B41J 3/54

(Continued)

OTHER PUBLICATIONS

Japanese Office Action (Application No. 2019-177773) dated May 16, 2023 (with English translation) (10 pages).

(Continued)

*Primary Examiner* — Sharon Polk
(74) *Attorney, Agent, or Firm* — BURR PATENT LAW, PLLC

(57) ABSTRACT

[Object] To provide a printer system that is simple in structure, and has dual-head capability or duplex printing capability as desired.
[Solution] A printer system 1 includes a first printer unit 10, and a second printer unit 20. The first printer unit 10 includes a first-printer housing 10*a*, and a first thermal transfer part 13. The second printer unit 20 includes a second-printer housing 20*a*, and a second thermal transfer part 23. The first printer unit 10 and the second printer unit 20 are independent of each other and capable of connecting to each other. A sheet printing paper 2 printed on by the first printer unit 10 is sent to the second printer unit 20 and then continuously printed on by the second printer unit 20.

10 Claims, 14 Drawing Sheets

(56) References Cited

FOREIGN PATENT DOCUMENTS

| | | | | |
|---|---|---|---|---|
| JP | 2009-119631 | A | | 6/2009 |
| JP | 2013-212690 | A | | 10/2013 |
| JP | 2014-129170 | A | | 7/2014 |
| JP | 2016-016583 | A | | 2/2016 |
| JP | 2018047580 | A | * | 3/2018 |
| JP | 2018-118401 | A | | 8/2018 |
| JP | 2019-077086 | A | | 5/2019 |

OTHER PUBLICATIONS

English translation of the International Preliminary Report on Patentability (Chapter I) dated Apr. 7, 2022 (Application No. PCT/JP2020/036486).

International Search Report and Written Opinion (Application No. PCT/JP2020/036486) dated Dec. 15, 2020 (with English translation).

* cited by examiner

PRINTER SYSTEM

TECHNICAL FIELD

The present disclosure relates to a printer system including a combination of multiple single-head simplex printers each having a single ribbon assembly. The printer system is designed to achieve dual-head capability or duplex printing capability as desired.

BACKGROUND ART

A known example of dye-sublimation printers is duplex printers capable of printing on both sides of printing paper (see PTL 1).

Another known example of dye-sublimation printers is dual-head printers that use two ribbon assemblies to first print an image or other information on one side of printing paper through dye-sublimation printing. Such a dual-head printer prints a special color such as hologram or pearl on the same side of the printing paper.

CITATION LIST

Patent Literature

PTL 1: Japanese Unexamined Patent Application

SUMMARY OF INVENTION

Technical Problem

Such a duplex printer or dual-head printer mentioned above, however, is fabricated as a product separate from a common single-head simplex printer having a single ribbon assembly. In this case, the duplex printer needs to have a reversing function incorporated in the housing to reverse the orientation of the printing paper. This adds complexity to the structure of the duplex printer. Similarly, in the case of the dual-head printer, two ribbon assemblies and two thermal transfer parts need to be accommodated in the housing of the dual-head printer. This adds complexity to the structure of the dual-head printer.

In view of the above circumstances, it is an object of the present disclosure to provide a printer system having dual-head capability or duplex printing capability. The printer system is simplified in its structure.

Solution to Problem

According to the present disclosure, there is provided a printer system including a first printer unit, and a second printer unit. The first printer unit prints on a printing paper. The first printer unit has a first-printer housing, and a first thermal transfer part disposed in the first-printer housing. The second printer unit prints on the printing paper. The second printer unit has a second-printer housing, and a second thermal transfer part disposed in the second-printer housing. The first printer unit and the second printer unit are independent of each other and capable of connecting to each other. The printing paper printed on by the first printer unit is sent to the second printer unit and then continuously printed on by the second printer unit.

According to the present disclosure, in the printer system, the first thermal transfer part of the first printer unit faces one side of the printing paper, and the second thermal transfer part of the second printer unit faces the other side of the printing paper.

According to the present disclosure, in the printer system, the first printer unit and the second printer unit are identical to each other in structure, and the second printer unit is placed in an inverted position relative to the first printer unit.

According to the present disclosure, in the printer system, the first thermal transfer part of the first printer unit, and the second thermal transfer part of the second printer unit face one side of the printing paper.

According to the present disclosure, in the printer system, a sheet-printing-paper supply part that supplies a sheet printing paper is connected upstream of the first printer unit.

According to the present disclosure, in the printer system, a printing-paper supply unit is connected upstream of the first printer unit. The printing-paper supply unit includes a printing-paper supply housing, and a roll-printing-paper supply part. The roll-printing-paper supply part is disposed in the printing-paper supply housing to supply a roll printing paper.

According to the present disclosure, in the printer system, the first printer unit and the second printer unit are connected to each other via a cutter unit. The cutter unit includes a cutter housing, and a cutter disposed in the cutter housing. The cutter cuts the roll printing paper to create a sheet printing paper.

According to the present disclosure, in the printer system, a guide flap that guides the roll printing paper printed on by the first printer unit is disposed near an exit of the first printer unit. The guide flap assumes a transport position or a release position. The transport position is a position in which the guide flap sends the roll printing paper toward the cutter of the cutter unit. The release position is a position in which the guide flap releases the roll printer paper outward away from the cutter of the cutter unit.

According to the present disclosure, in the printer system, the cutter unit includes a paper-connecting plate that transports the cut sheet printing paper to the second printer unit.

According to the present disclosure, in the printer system, the paper-connecting plate is capable of being swung by a push-out mechanism. The push-out mechanism is provided to the second printer unit, and comes into contact with the paper-connecting plate. The paper-connecting plate assumes a transport position or a standby position. The transport position is a position in which the paper-connecting plate transports the sheet printing paper toward the second printer unit. The standby position is a position in which the paper-connecting plate does not allow the sheet printing paper to be transported toward the second printer unit.

According to the present disclosure, in the printer system, the second printer unit includes a pair of left and right push-out mechanisms with different shapes. When the second printer unit is placed in a normal position, one of the push-out mechanisms comes into contact with the paper-connecting plate to cause the paper-connecting plate to assume the transport position. When the second printer unit is placed in an inverted position, the other one of the push-out mechanisms comes into contact with the paper-connecting plate to cause the paper-connecting plate to assume the standby position.

According to the present disclosure, in the printer system, at least one of the first printer unit and the second printer unit includes an ink ribbon cassette. The ink ribbon cassette includes a cassette body, and an ink ribbon assembly accommodated in the cassette body. The ink ribbon assembly includes an ink ribbon supply part, an ink ribbon take-up part, and an ink ribbon extending between the ink ribbon supply part and the ink ribbon take-up part. The cassette body includes an ink-ribbon-supply-part accommodating part, and an ink-ribbon-take-up-part accommodating part. The ink-ribbon-supply-part accommodating part accommodates the ink ribbon supply part, and has one open side. The ink-ribbon-take-up-part accommodating part accommodates the ink ribbon take-up part, and has one open side. Stoppers that engage and lock the ink ribbon supply part and the ink ribbon take-up part in place are disposed at the one open side of the ink-ribbon-supply-part accommodating part, and at the one open side of the ink-ribbon-take-up-part accommodating part.

Advantageous Effects of Invention

As described above, the present disclosure provides a printer system that offers dual-head capability or duplex printing capability as desired. The printer system is simplified in its structure.

DESCRIPTION OF EMBODIMENTS

First Embodiment

A first embodiment of the present disclosure is now described below with reference to the drawings.

FIGS. 1 to 5 illustrate the first embodiment of the present disclosure.

Figure 1:
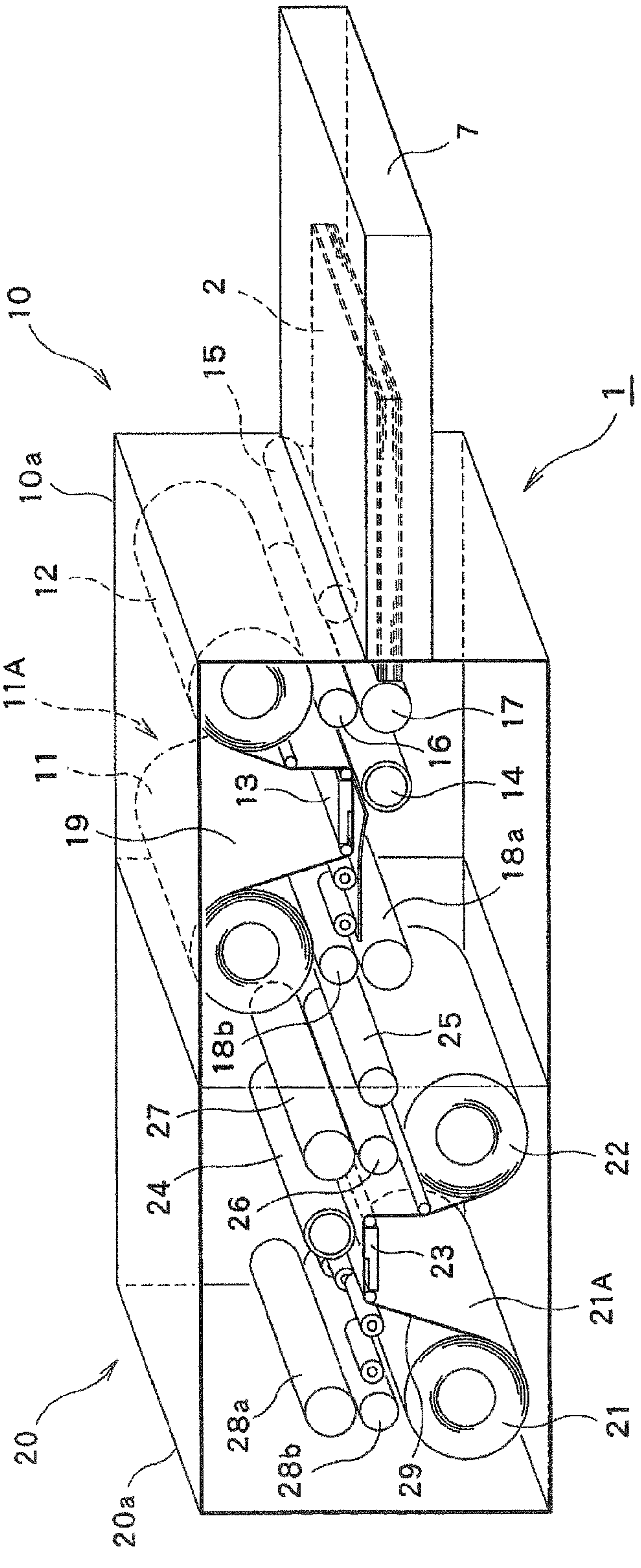
FIG. 1 is a schematic perspective view of a printer system according to a first embodiment.
Figure 2:
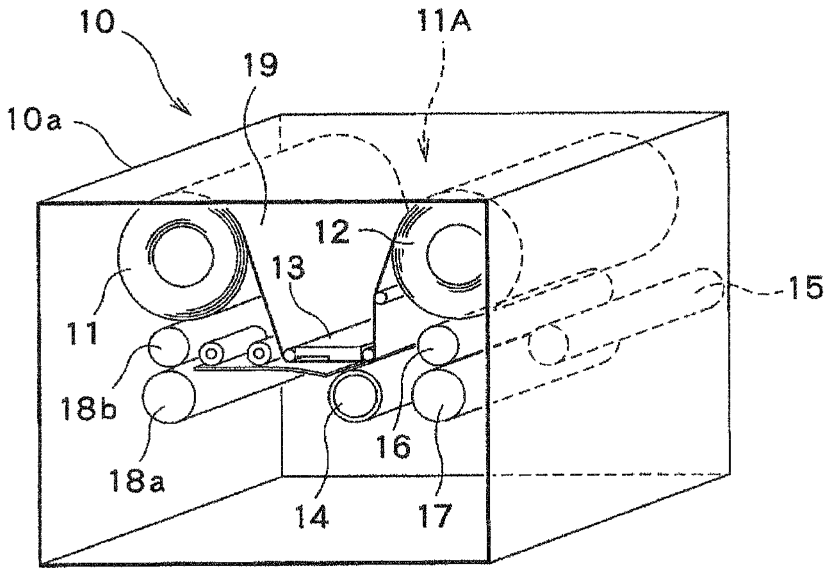
FIG. 2 is a perspective view of a first printer unit of the printer system according to the first embodiment.
Figure 3:
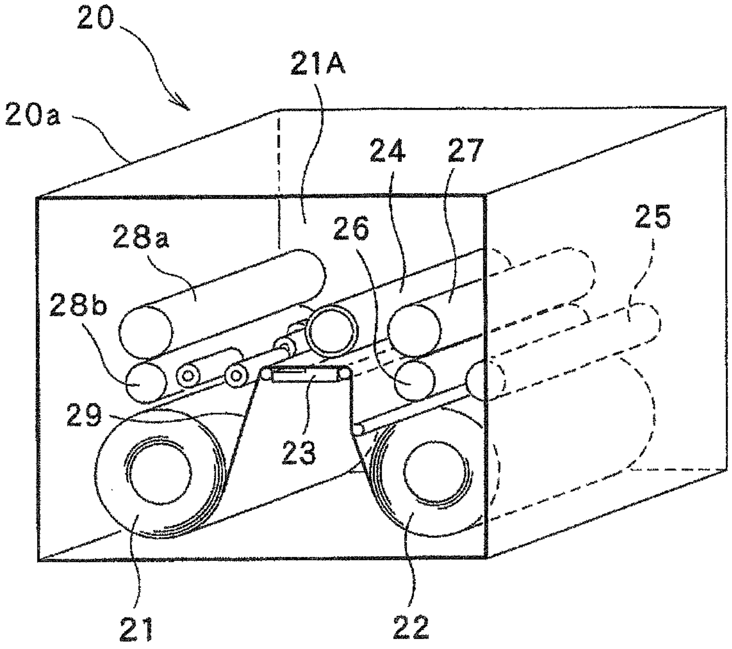
FIG. 3 is a perspective view of a second printer unit of the printer system according to the first embodiment.

Reference is first made to FIGS. 1 to 3 to describe a printer system 1 according to the first embodiment. As illustrated in FIGS. 1 to 3, the printer system 1 includes a first printer unit 10, and a second printer unit 20. The first printer unit 10 includes a first-printer housing 10*a*, and a first thermal transfer part 13 (to be also referred to as first thermal head hereinafter) disposed in the first-printer housing 10*a*. The first printer unit 10 prints on a sheet printing paper 2, which is a printing paper in sheet form. The second printer unit 20 includes a second-printer housing 20*a*, and a second thermal head 23 (to be also referred to as second thermal head hereinafter) disposed in the second-printer housing 20*a*. The second printer unit 20 prints on the sheet printing paper 2.

As illustrated in FIGS. 1 to 3, the first printer unit 10 and the second printer unit 20 are substantially identical to each other in structure. The printer system 1 according to the first embodiment is obtained by connecting the second printer unit 20 to the first printer unit 10. At this time, the second printer unit 20 is placed in an inverted position relative to the first printer unit 10 that is placed in a normal position.

A sheet-printing-paper supply part 7 is disposed upstream of the first printer unit 10 to supply the sheet printing paper 2 toward the first printer unit 10.

Detailed reference is now made to the first printer unit 10 and the second printer unit 20.

The first printer unit 10 includes a feed roller 15, a pinch roller 16, and a grip roller 17, which are disposed in the first-printer housing 10*a* in the stated order as viewed from the upstream side. The feed roller 15 feeds the sheet printing paper 2. The pinch roller 16 and the grip roller 17 hold and transport the sheet printing paper 2. A first platen roller 14 is disposed in the first-printer housing 10*a*. The first platen roller 14 is disposed facing the first thermal head 13, and holds the sheet printing paper 2 between the first platen roller 14 and the first thermal head 13. An ink ribbon assembly 11A is mounted in the first-printer housing 10*a*. The ink ribbon assembly 11A includes an ink ribbon supply part 11, an ink ribbon take-up part 12, and an ink ribbon 19 extending between the ink ribbon supply part 11 and the ink ribbon take-up part 12.

Further, delivery rollers 18*a* and 18*b* are disposed in the first-printer housing 10*a* to hold the sheet printing paper 2 and discharge the sheet printing paper 2 outward. The delivery rollers 18*a* and 18*b* are located downstream of the first thermal head 13 and the first platen roller 14.

Further, the second printer unit 20 includes a feed roller 25, a pinch roller 26, and a grip roller 27, which are disposed in the second-printer housing 20*a* in the stated order as viewed from the upstream side. The feed roller 25 feeds the sheet printing paper 2. The pinch roller 26 and the grip roller 27 hold and transport the sheet printing paper 2. A second platen roller 24 is disposed in the second-printer housing 20*a* to hold the sheet printing paper 2 between the second platen roller 24 and the second thermal head 23. The second platen roller 24 faces the second thermal head 23. An ink ribbon assembly 21A is disposed in the second-printer housing 20*a*. The ink ribbon assembly 21A includes an ink ribbon supply part 21, an ink ribbon take-up part 22, and an ink ribbon 29 extending between the ink ribbon supply part 21 and the ink ribbon take-up part 22.

Further, delivery rollers 28*a* and 28*b* are disposed in the second-printer housing 20*a* to hold the sheet printing paper 2 and discharge the sheet printing paper 2 outward. The delivery rollers 28*a* and 28*b* are located downstream of the second thermal head 23 and the second platen roller 24.

Figure 5:
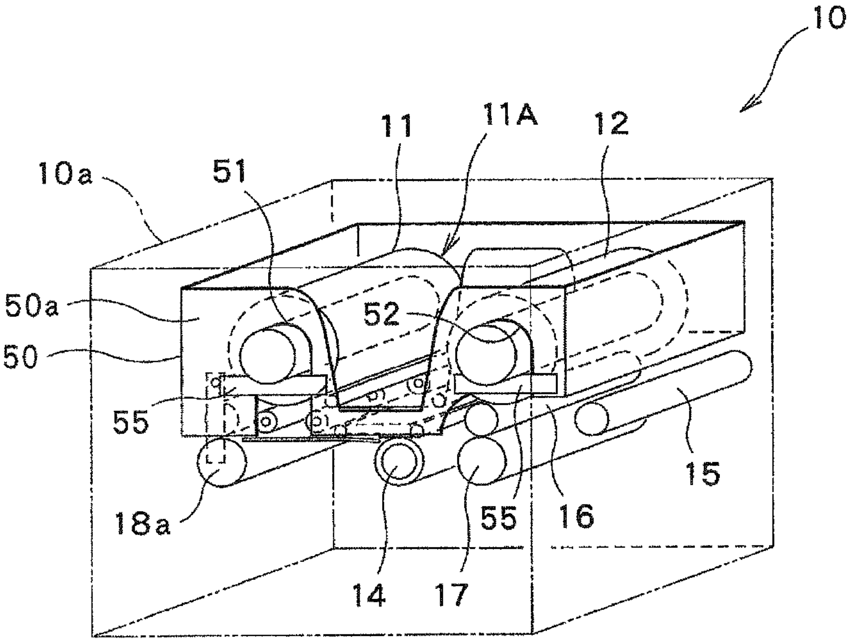
FIG. 5 is a detail illustration of the first printer unit of the printer system according to the first embodiment.

As illustrated in FIG. 5, the ink ribbon assembly 11A can be mounted to the first printer unit 10. As described above, the ink ribbon assembly 11A includes the ink ribbon supply part 11, the ink ribbon take-up part 12, and the ink ribbon 19 extending between the ink ribbon supply part 11 and the ink ribbon take-up part 12. The ink ribbon assembly 11A is accommodated in a cassette body 50*a* installed in the first-printer housing 10*a*. The cassette body 50*a*, and the ink ribbon assembly 11A accommodated in the cassette body 50*a* constitute an ink ribbon cassette 50.

Further, the cassette body 50*a* of the ink ribbon cassette 50 includes an ink-ribbon-supply-part accommodating part 51 that accommodates the ink ribbon supply part 11, and an ink-ribbon-take-up-part accommodating part 52 that accommodates the ink ribbon take-up part 12.

Each of the ink-ribbon-supply-part accommodating part 51 and the ink-ribbon-take-up-part accommodating part 52 of the cassette body 50*a* is open on the bottom side (one side). Stoppers 55 are disposed at the one open side of the ink-ribbon-supply-part accommodating part 51, and at the one open side of the ink-ribbon-take-up-part accommodating part 52. With the first printer unit 10 placed in a normal position, the ink ribbon supply part 11 of the ink-ribbon-supply-part accommodating part 51 is supported by the stopper 55. This prevents the ink ribbon supply part 11 from falling downward. Likewise, the ink ribbon take-up part 12 in the ink-ribbon-take-up-part accommodating part 52 is supported by the stopper 55. This prevents the ink ribbon take-up part 12 from falling downward.

With the first printer unit 10 placed in an inverted position, that is, in the same position as the second printer unit 20, the ink ribbon supply part 11 in the ink-ribbon-supply-part accommodating part 51 is supported from below by the ink-ribbon-supply-part accommodating part 51. At this time, the ink ribbon take-up part 12 in the ink-ribbon-take-up-part accommodating part 52 is supported from below by the ink-ribbon-take-up-part accommodating part 52. The above-mentioned configuration ensures that neither the ink ribbon supply part 11 nor the ink ribbon take-up part 12 falls downward.

The second printer unit 20 similarly includes the ink ribbon assembly 21A, which includes the following components: the ink ribbon supply part 21, the ink ribbon take-up part 22, and the ink ribbon 29 extending between the ink ribbon supply part 21 and the ink ribbon take-up part 22. The ink ribbon assembly 21A is accommodated in the cassette body 50*a* installed in the second-printer housing 20*a* and identical in structure to that of the first printer unit 10. The cassette body 50*a* and the ink ribbon assembly 21A constitute the ink ribbon cassette 50 (see FIG. 5).

According to the first embodiment of the present disclosure, in the case of the first printer unit 10 placed in a normal position, the stoppers 55 of the cassette body 50*a* hold the ink ribbon assembly 11A in place. In this regard, in the case of the second printer unit 20 placed in an inverted position as well, the stoppers 55 may hold the ink ribbon assembly 21A in place.

As described above, the first printer unit 10 and the second printer unit 20 are substantially identical to each other in structure. The second printer unit 20 placed in an inverted position (see FIG. 3) is connected to the first printer unit 10 placed in a normal position (see FIG. 2). The printer system 1 according to the first embodiment is thus obtained.

In the printer system 1, the sheet printing paper 2 printed on by the first printer unit 10 is sent to the second printer unit 20. The sheet printing paper 2 printed on by the first printer unit 10 is then continuously printed on by the second printer unit 20.

Reference is now made to the connection between the first printer unit 10 and the second printer unit 20. The exit side of the first printer unit 10 where the sheet printing paper 2 exits the first printer unit 10 is located at the same position (height) as the position (height) of the entrance side of the second printer unit 20 where the sheet printing paper 2 enters the second printer unit 20. This ensures that the sheet printing paper 2 printed on by the first printer unit 10 is smoothly moved toward the entrance of the second printer unit 20.

One of the first-printer housing 10*a* of the first printer unit 10, and the second-printer housing 20*a* of the second printer unit 20 is provided with a projection (not illustrated). The other one of the first-printer housing 10*a* and the second-printer housing 20*a* is provided with a recess (not illustrated) for fitting engagement with the projection. By bringing the projection and the recess into fitting engagement with each other, the first printer unit 10 and the second printer unit 20 are accurately connected to each other at the correct position.

One of the first-printer housing 10*a* and the second-printer housing 20*a* may be provided with a reference component (not illustrated), and the other may be provided with a detector (not illustrated) that detects the reference component. As described above, the first-printer housing 10*a* and the second-printer housing 20*a* are each provided with the reference component or the detector. In this case, if the first printer unit 10 and the second printer unit 20 have been accurately connected to each other at the correct position, this can be detected by the detector. A signal from the detector is sent to a controller (not illustrated) of the first printer unit 10 and to a controller (not illustrated) of the second printer unit 20.

Upon connecting the first printer unit 10 and the second printer unit 20 to each other, the controller of the first printer unit 10 and the controller of the second printer unit 20 are electrically connected to each other.

Reference is now made to operation of the first embodiment configured as described above.

First, as illustrated in FIGS. 1 to 3, the first printer unit 10 and the second printer unit 20 that are independent of each other and identical to each other in structure are prepared. Subsequently, the second printer unit 20 placed in an inverted position is connected to the first printer unit 10 placed in a normal position. The printer system 1 according to the first embodiment is thus obtained.

Figure 4:
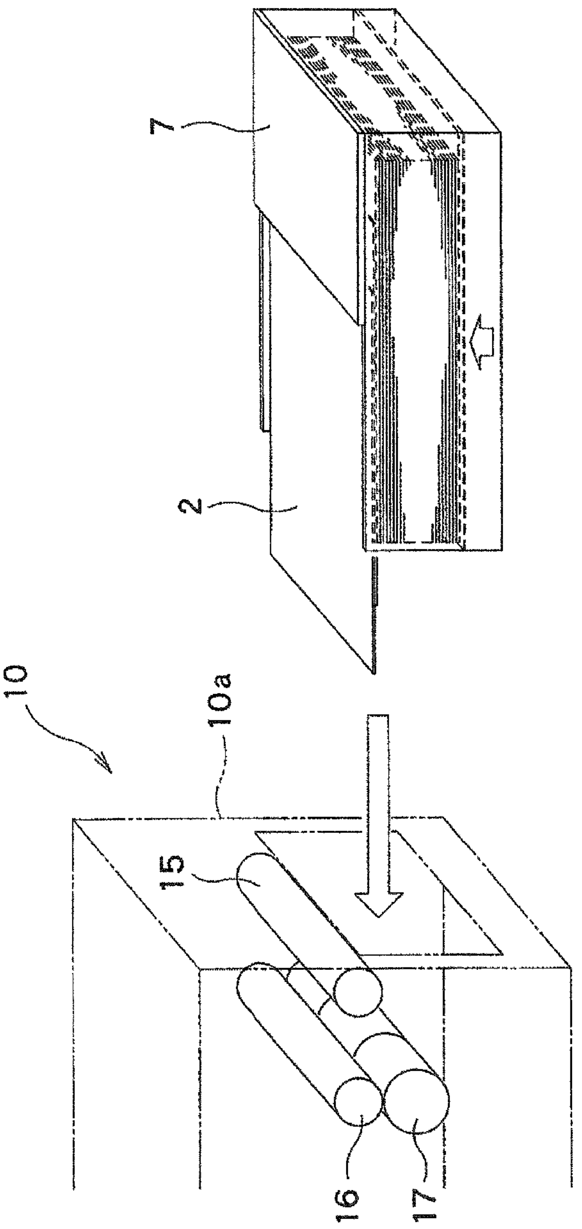
FIG. 4 illustrates the first printer unit and a sheet-printing-paper supply part of the printer system according to the first embodiment.

Subsequently, as illustrated in FIG. 4, the sheet-printing-paper supply part 7 accommodating multiple sheets of sheet printing paper 2 is installed near the entrance of the first printer unit 10. The sheet printing paper 2 is sequentially sent sheet by sheet from the sheet-printing-paper supply part 7 toward the first printer unit 10.

The sheet printing paper 2 sent to the first printer unit 10 sequentially passes the feed roller 15, and then the pinch roller 16 and the grip roller 17. The sheet printing paper 2 is then sent to the location between the first thermal head 13 and the first platen roller 14.

Subsequently, the ink ribbon 19 is sent to the location between the first thermal head 13 and the first platen roller 14 from the ink ribbon supply part 11. In this case, the first thermal head 13 faces one side, the top side, of the sheet printing paper 2. The ink ribbon 19 has the colors yellow, magenta, and cyan, and an overcoat layer.

The sheet printing paper 2 and the ink ribbon 19 are then held between the first thermal head 13 and the first platen roller 14. Subsequently, the sheet printing paper 2 is retracted toward the sheet-printing-paper supply part 7, and the ink ribbon 19 is heated and pressed against the sheet printing paper 2 by the first thermal head 13. In this way, the colors yellow, magenta, and cyan on the ink ribbon 19 are thermally transferred by the first thermal head 13 onto the sheet printing paper 2 through a dye-sublimation process. Further, the overcoat layer is thermally transferred and printed onto the sheet printing paper 2 on which these colors have been thermally transferred.

As described above, the ink ribbon 19 is heated and pressed against the sheet printing paper 2 by the first thermal head 13. As a result, the colors yellow, magenta, and cyan, and the overcoat layer are thermally transferred and printed onto the top side of the sheet printing paper 2.

The sheet printing paper 2 thus printed on its top side by the first printer unit 10 is then sent toward the second printer unit 20 via the delivery rollers 18*a* and 18*b*.

The second printer unit 20 is placed in an inverted position relative to the first printer unit 10 that is placed in a normal position. In this case, the second thermal head 23 of the second printer unit 20 faces the other side, the bottom side, of the sheet printing paper 2.

Subsequently, the sheet printing paper 2 sent to the second printer unit 20 sequentially passes the feed roller 25, and then the pinch roller 26 and the grip roller 27. The sheet printing paper 2 is then sent to the location between the second thermal head 23 and the second platen roller 24.

Subsequently, the ink ribbon 29 is sent to the location between the second thermal head 23 and the second platen roller 24 from the ink ribbon supply part 21. In this case, the ink ribbon 29 has the colors yellow, magenta, and cyan, and an overcoat layer.

The sheet printing paper 2 and the ink ribbon 29 are then held between the second thermal head 23 and the second platen roller 24. Subsequently, with the sheet printing paper 2 being retracted toward the first printer unit 10, the ink ribbon 29 is heated and pressed against the sheet printing paper 2 by the second thermal head 23. In this way, the colors yellow, magenta, and cyan on the ink ribbon 29 are thermally transferred by the second thermal head 23 onto the sheet printing paper 2 through a dye-sublimation process. Further, the overcoat layer is thermally transferred and printed onto the sheet printing paper 2 on which these colors have been thermally transferred.

As described above, the ink ribbon 29 is heated and pressed against the sheet printing paper 2 by the second thermal head 23. As a result, the colors yellow, magenta, and cyan, and the overcoat layer are thermally transferred and printed onto the other side, the bottom side, of the sheet printing paper 2.

As described above, according to the first embodiment, the printer system 1 is obtained in an easy and simple manner solely by connecting the second printer unit 20 placed in an inverted position to the first printer unit 10 placed in a normal position. In this case, the sheet printing paper 2 is printed on its top side by the first printer unit 10 of the printer system 1. The sheet printing paper 2 is printed on its bottom side by the second printer unit 20. In this way, duplex printing is performed on the sheet printing paper 2 by the printer system 1. In this case, the printer system 1 does not need to incorporate a complicated printing-paper reversing mechanism to perform duplex printing on the sheet printing paper 2. As a result, the printer system 1 is simplified in overall structure.

In connecting the first printer unit 10 and the second printer unit 20 to each other, the projection and the recess, which are each provided to the first-printer housing 10*a* or the second-printer housing 20*a*, are brought into fitting engagement with each other. This makes it possible to connect the first printer unit 10 and the second printer unit 20 with ease and at the correct position.

Furthermore, the reference component provided to the first-printer housing 10*a* or the second-printer housing 20*a* is detected by the corresponding detector. This makes it possible to detect whether the first printer unit 10 and the second printer unit 20 have been connected to each other at the correct position.

Second Embodiment

Figure 6:
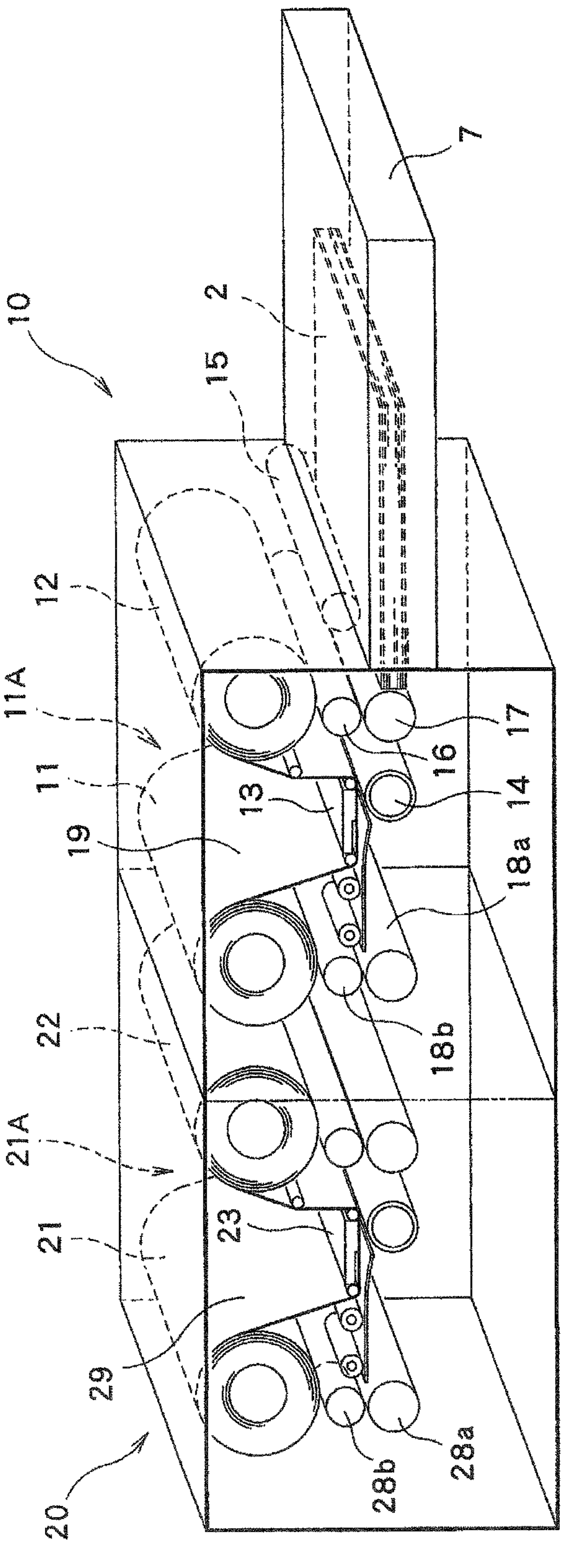
FIG. 6 is a schematic perspective view of a printer system according to a second embodiment.

Reference is now made to FIG. 6 to describe a second embodiment.

According to the second embodiment illustrated in FIG. 6, a printer system 1 includes a first printer unit 10 placed in a normal position, and a second printer unit 20 placed in a normal position and connected to the first printer unit 10. The second embodiment is otherwise substantially identical in structure to the first embodiment illustrated in FIGS. 1 to 5.

According to the second embodiment illustrated in FIG. 6, the ink ribbon 19 of the first printer unit 10 has the colors yellow, magenta, and cyan, and an overcoat layer, and the ink ribbon 29 of the second printer unit 20 has special colors such as hologram and pearl.

Features of the second embodiment in FIG. 6 identical to those of the first embodiment in FIGS. 1 to 5 are denoted by the same reference signs and not described in further detail.

Reference is now made to operation of the second embodiment configured as described above.

First, as illustrated in FIG. 6, the first printer unit 10 and the second printer unit 20 that are independent of each other and substantially identical to each other in structure are prepared. Subsequently, the second printer unit 20 placed in a normal position is connected to the first printer unit 10 placed in a normal position. The printer system 1 according to the second embodiment is thus obtained.

Subsequently, the sheet-printing-paper supply part 7 accommodating multiple sheets of sheet printing paper 2 is installed near the entrance of the first printer unit 10. The sheet printing paper 2 is sequentially sent sheet by sheet from the sheet-printing-paper supply part 7 toward the first printer unit 10.

The sheet printing paper 2 sent to the first printer unit 10 sequentially passes the feed roller 15, and then the pinch roller 16 and the grip roller 17. The sheet printing paper 2 is then sent to the location between the first thermal head 13 and the first platen roller 14.

Subsequently, the ink ribbon 19 is sent to the location between the first thermal head 13 and the first platen roller 14 from the ink ribbon supply part 11. In this case, the first thermal head 13 faces one side, the top side, of the sheet printing paper 2.

The sheet printing paper 2 and the ink ribbon 19 are then held between the first thermal head 13 and the first platen roller 14. Subsequently, the sheet printing paper 2 is retracted toward the sheet-printing-paper supply part 7, and the ink ribbon 19 is heated and pressed against the sheet printing paper 2 by the first thermal head 13. In this way, the colors yellow, magenta, and cyan on the ink ribbon 19 are thermally transferred by the first thermal head 13 onto the sheet printing paper 2 through a dye-sublimation process. Further, the overcoat layer is thermally transferred and printed onto the sheet printing paper 2 on which these colors have been thermally transferred.

As described above, as the ink ribbon 19 is heated and pressed against the sheet printing paper 2 by the first thermal head 13, the colors yellow, magenta, and cyan, and the overcoat layer are thermally transferred and printed onto the top side of the sheet printing paper 2.

The sheet printing paper 2 thus printed on its top side by the first printer unit 10 is then sent toward the second printer unit 20 via the delivery rollers 18*a* and 18*b*.

As with the first printer unit 10 placed in a normal position, the second printer unit 20 is placed in a normal position. This means that the second thermal head 23 of the second printer unit 20 faces one side, the top side, of the sheet printing paper 2.

Subsequently, the sheet printing paper 2 sent to the second printer unit 20 sequentially passes the feed roller 25, and then the pinch roller 26 and the grip roller 27. The sheet printing paper 2 is then sent to the location between the second thermal head 23 and the second platen roller 24.

Subsequently, the ink ribbon 29 is sent to the location between the second thermal head 23 and the second platen roller 24 from the ink ribbon supply part 21.

The sheet printing paper 2 and the ink ribbon 29 are then held between the second thermal head 23 and the second platen roller 24. Subsequently, with the sheet printing paper 2 being retracted toward the first printer unit 10, the ink ribbon 29 is heated and pressed against the sheet printing paper 2 by the second thermal head 23. In this way, the special colors such as hologram and pearl on the ink ribbon 29 are thermally transferred by the second thermal head 23 onto the sheet printing paper 2.

As described above, the ink ribbon 29 is heated and pressed against the sheet printing paper 2 by the second thermal head 23. As a result, in addition to the colors yellow, magenta, and cyan, and the overcoat layer, special colors such as hologram and pearl are thermally transferred and printed onto the top side of the sheet printing paper 2.

As described above, according to the second embodiment, the printer system 1 is obtained in an easy and simple manner solely by connecting the first printer unit 10, which is placed in a normal position, with the second printer unit 20, which is likewise placed in a normal position. In this case, the colors yellow, magenta, and cyan, and the overcoat layer are thermally transferred and printed by the first printer unit 10 of the printer system 1 onto the top side of the sheet printing paper 2. Special colors such as hologram and pearl are thermally transferred and printed by the second printer unit 20 onto the top side of the sheet printing paper 2. In this way, the printer system 1 prints the colors yellow, magenta, and cyan, and the overcoat layer onto the sheet printing paper 2, and prints special colors such as hologram and pearl onto the sheet printing paper 2. The printer system 1 thus performs dual-head printing on the sheet printing paper 2. In this case, the printer system 1 does not need to incorporate a complicated dual-head mechanism to perform dual-head printing on the sheet printing paper 2. As a result, the printer system 1 is simplified in overall structure.

In connecting the first printer unit 10 and the second printer unit 20 to each other, the projection and the recess, which are each provided to the first-printer housing 10*a* or the second-printer housing 20*a*, are brought into fitting engagement with each other. This makes it possible to connect the first printer unit 10 and the second printer unit 20 with ease and at the correct position.

Furthermore, the reference component provided to the first-printer housing 10*a* or the second-printer housing 20*a* is detected by the corresponding detector. This makes it possible to detect whether the first printer unit 10 and the second printer unit 20 have been connected to each other at the correct position.

Third Embodiment

A third embodiment of the present disclosure is now described below with reference to the drawings.

Figure 7:
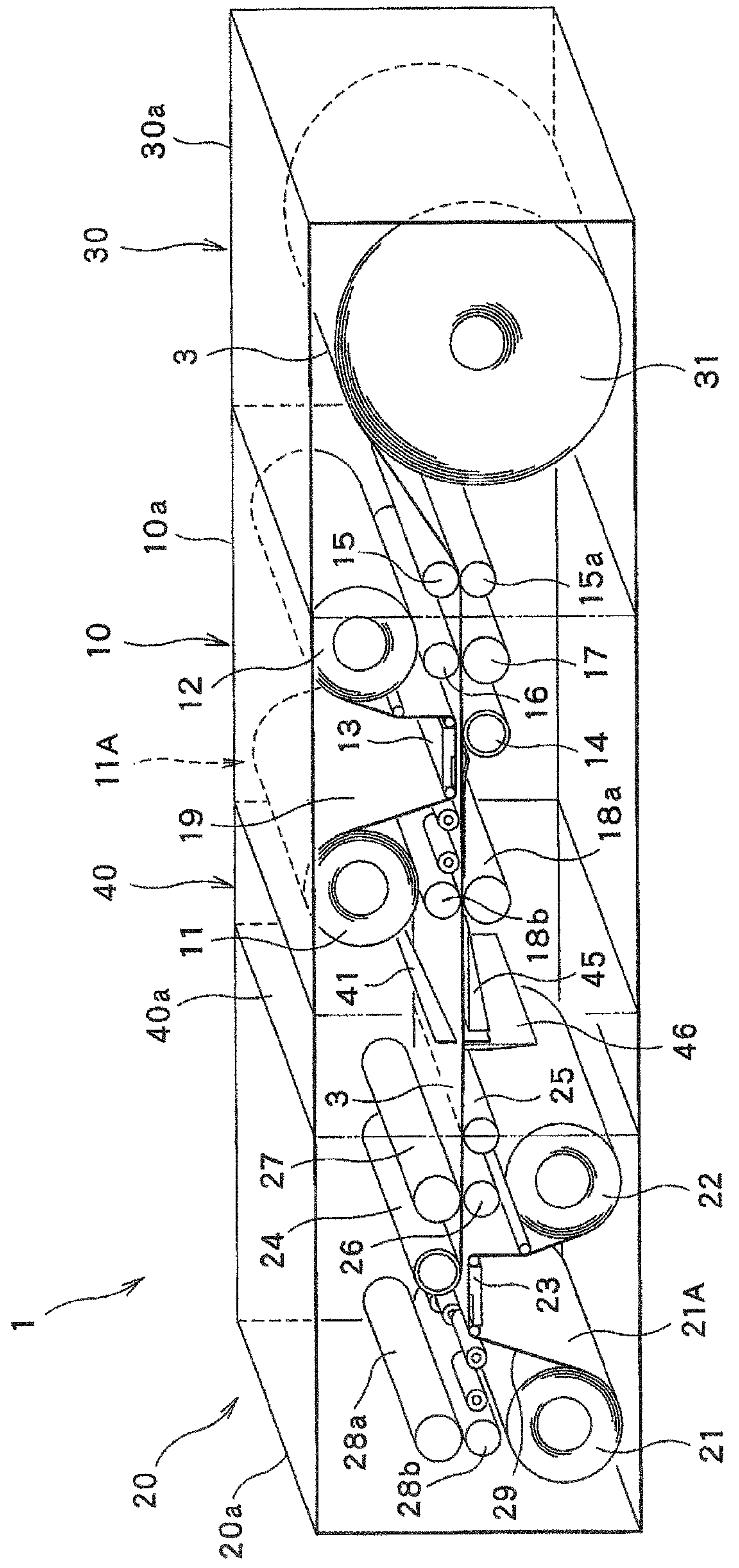
FIG. 7 is a schematic perspective view of a printer system according to a third embodiment.
Figure 15:
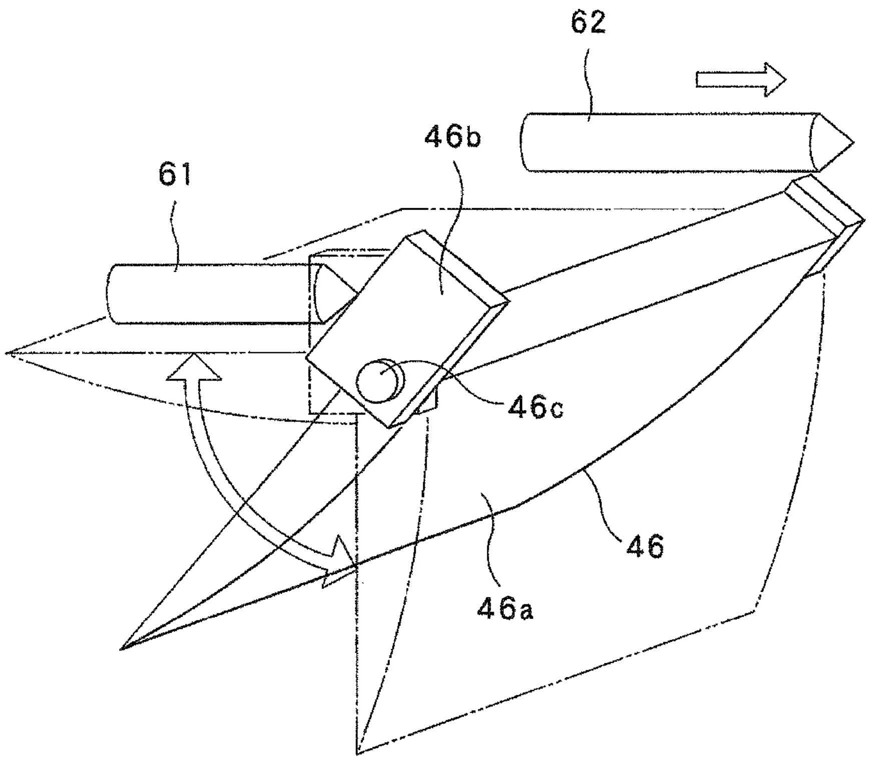
FIG. 15 illustrates operation of the paper-connecting plate.

FIGS. 7 and 15 illustrate the third embodiment of the present disclosure.

Reference is first made to FIG. 7 to describe a printer system 1 according to the third embodiment. As illustrated in FIG. 7, the printer system 1 includes a first printer unit 10, and a second printer unit 20. The first printer unit 10 includes a first-printer housing 10*a*, and a first thermal transfer part 13 (to be also referred to as first thermal head hereinafter) disposed in the first-printer housing 10*a*. The first printer unit 10 prints on a roll printing paper 3, which is a printing paper in roll form. The second printer unit 20 includes a second-printer housing 20*a*, and a second thermal head 23 (to be also referred to as second thermal head hereinafter) disposed in the second-printer housing 20*a*. The second printer unit 20 prints on a sheet printing paper 2.

A printing-paper supply unit 30 is connected upstream (on the right-hand side in FIG. 7) of the first printer unit 10. The printing-paper supply unit 30 includes a printing-paper supply housing 30*a*, and a roll-printing-paper supply part 31, which is disposed in the printing-paper supply housing 30*a* and supplies the roll printing paper 3.

Further, a cutter unit 40 is interposed between the first printer unit 10 and the second printer unit 20. The cutter unit 40 includes a cutter housing 40*a*, and a cutter 41, which is disposed in the cutter housing 40*a* and cuts the roll printing paper 3 to create the sheet printing paper 2. Although the cutter 41 of the cutter unit 40 is in the form of a pair of cutting blades, the cutter 41 may be in the form of a rotary blade.

As illustrated in FIG. 7, the first printer unit 10 and the second printer unit 20 are substantially identical to each other in structure. The second printer unit 20 placed in an inverted position is connected to the first printer unit 10 placed in a normal position. The printer system 1 according to the third embodiment is thus obtained. At this time, the cutter unit 40 is interposed between the first printer unit 10 and the second printer unit 20.

Detailed reference is now made to the printing-paper supply unit 30, the first printer unit 10, the cutter unit 40, and the second printer unit 20.

First, the printing-paper supply unit 30 includes the printing-paper supply housing 30*a*, and the roll-printing-paper supply part 31. The roll-printing-paper supply part 31, which is disposed in the printing-paper supply housing 30*a*, accommodates the roll printing paper 3, and supplies the roll printing paper 3 toward the first printer unit 10.

Reference is now made to the first printer unit 10 and the second printer unit 20.

The first printer unit 10 includes a feed roller 15, an additional feed roller 15*a*, a pinch roller 16, and a grip roller 17, which are disposed in the first-printer housing 10*a* in the stated order as viewed from the upstream side. The feed roller 15 and the additional feed roller 15*a* feed the roll printing paper 3. The pinch roller 16 and the grip roller 17 hold and transport the roll printing paper 3. A first platen roller 14 is disposed in the first-printer housing 10*a*. The first platen roller 14 is disposed facing the first thermal head 13, and holds the roll printing paper 3 between the first platen roller 14 and the first thermal head 13. An ink ribbon assembly 11A is disposed in the first-printer housing 10*a*. The ink ribbon assembly 11A includes an ink ribbon supply part 11, an ink ribbon take-up part 12, and an ink ribbon 19 extending between the ink ribbon supply part 11 and the ink ribbon take-up part 12.

Further, delivery rollers 18*a* and 18*b* are disposed in the first-printer housing 10*a* to hold the roll printing paper 3 and discharge the roll printing paper 3 outward. The delivery rollers 18*a* and 18*b* are located downstream of the first thermal head 13 and the first platen roller 14.

Further, the second printer unit 20 includes a feed roller 25, a pinch roller 26, and a grip roller 27, which are disposed in the second-printer housing 20*a* in the stated order as viewed from the upstream side. The feed roller 25 feeds the sheet printing paper 2. The pinch roller 26 and the grip roller 27 hold and transport the sheet printing paper 2. A second platen roller 24 is disposed in the second-printer housing 20*a* to hold the sheet printing paper 2 between the second platen roller 24 and the second thermal head 23. The second platen roller 24 faces the second thermal head 23. An ink ribbon assembly 21A is disposed in the second-printer housing 20*a*. The ink ribbon assembly 21A includes an ink ribbon supply part 21, an ink ribbon take-up part 22, and an ink ribbon 29 extending between the ink ribbon supply part 21 and the ink ribbon take-up part 22.

Further, delivery rollers 28*a* and 28*b* are disposed in the second-printer housing 20*a* to hold the sheet printing paper 2 and discharge the sheet printing paper 2 outward. The delivery rollers 28*a* and 28*b* are located downstream of the second thermal head 23 and the second platen roller 24.

As described above, the first printer unit 10 includes the ink ribbon assembly 11A. The ink ribbon assembly 11A includes the ink ribbon supply part 11, the ink ribbon take-up part 12, and the ink ribbon 19 extending between the ink ribbon supply part 11 and the ink ribbon take-up part 12. The ink ribbon assembly 11A is accommodated in a cassette body 50*a* installed in the first-printer housing 10*a* (see FIG. 5). The cassette body 50*a*, and the ink ribbon assembly 11A accommodated in the cassette body 50*a* constitute an ink ribbon cassette 50.

Further, the cassette body 50*a* of the ink ribbon cassette 50 includes an ink-ribbon-supply-part accommodating part 51 that accommodates the ink ribbon supply part 11, and an ink-ribbon-take-up-part accommodating part 52 that accommodates the ink ribbon take-up part 12.

Each of the ink-ribbon-supply-part accommodating part 51 and the ink-ribbon-take-up-part accommodating part 52 of the cassette body 50*a* is open on the bottom side (one side). Stoppers 55 are disposed at the one open side of the ink-ribbon-supply-part accommodating part 51, and at the one open side of the ink-ribbon-take-up-part accommodating part 52. With the first printer unit 10 placed in a normal position, the ink ribbon supply part 11 of the ink-ribbon-supply-part accommodating part 51 is supported by the stopper 55. This prevents the ink ribbon supply part 11 from falling downward. Likewise, the ink ribbon take-up part 12 in the ink-ribbon-take-up-part accommodating part 52 is supported by the stopper 55. This prevents the ink ribbon take-up part 12 from falling downward.

When the first printer unit 10 is placed in an inverted position, that is, in the same position as the second printer unit 20, the ink ribbon supply part 11 in the ink-ribbon-supply-part accommodating part 51 is supported from below by the ink-ribbon-supply-part accommodating part 51. At this time, the ink ribbon take-up part 12 in the ink-ribbon-take-up-part accommodating part 52 is supported from below by the ink-ribbon-take-up-part accommodating part 52. The above-mentioned configuration ensures that neither the ink ribbon supply part 11 nor the ink ribbon take-up part 12 falls downward.

The second printer unit 20 similarly includes the ink ribbon assembly 21A, which includes the following components: the ink ribbon supply part 21, the ink ribbon take-up part 22, and the ink ribbon 29 extending between the ink ribbon supply part 21 and the ink ribbon take-up part 22. The ink ribbon assembly 21A is accommodated in the cassette body 50*a* installed in the second-printer housing 20*a* and identical in structure to that of the first printer unit 10. The cassette body 50*a* and the ink ribbon assembly 21A constitute the ink ribbon cassette 50 (see FIG. 5).

According to the third embodiment of the present disclosure, in the case of the first printer unit 10 placed in a normal position, the stoppers 55 of the cassette body 50*a* hold the ink ribbon assembly 11A in place. In this regard, in the case of the second printer unit 20 placed in an inverted position as well, the stoppers 55 of the cassette body 50*a* may hold the ink ribbon assembly 21A in place.

As described above, the first printer unit 10 and the second printer unit 20 are substantially identical to each other in structure. The second printer unit 20 placed in an inverted position is connected via the cutter unit 40 to the first printer unit 10 placed in a normal position. The printer system 1 according to the third embodiment is thus obtained.

In the printer system 1, the roll printing paper 3 printed on by the first printer unit 10 is sent to the cutter unit 40. The roll printing paper 3 is cut by the cutter unit 40, and the sheet printing paper 2 is created.

Subsequently, the sheet printing paper 2 is sent to the second printer unit 20. The sheet printing paper 2 printed on by the first printer unit 10 is then continuously printed on by the second printer unit 20.

Reference is now made to the connection between the printing-paper supply unit 30 and the first printer unit 10. The exit side of the printing-paper supply unit 30 where the roll printing paper 3 exits the printing-paper supply unit 30 is located at the same position (height) as the position (height) of the entrance side of the first printer unit 10 where the roll printing paper 3 enters the first printer unit 10. This ensures that the roll printing paper 3 supplied from the printing-paper supply unit 30 is smoothly moved toward the entrance of the first printer unit 10.

One of the printing-paper supply housing 30*a* of the printing-paper supply unit 30, and the first-printer housing 10*a* of the first printer unit 10 is provided with a projection (not illustrated). The other one of the printing-paper supply housing 30*a* of the printing-paper supply unit 30, and the first-printer housing 10*a* of the first printer unit 10 is provided with a recess (not illustrated). By bringing the projection and the recess into fitting engagement with each other, the printing-paper supply unit 30 and the first printer unit 10 can be accurately connected to each other at the correct position.

One of the printing-paper supply housing 30*a* and the first-printer housing 10*a* may be provided with a reference component (not illustrated), and the other may be provided with a detector (not illustrated) that detects the reference component. As described above, the printing-paper supply housing 30*a* and the first-printer housing 10*a* are each provided with the reference component or the detector. Consequently, when the printing-paper supply unit 30 and the first printer unit 10 have been accurately connected to each other at the correct position, this can be detected by the detector. A signal from the detector is sent to a controller (not illustrated) of the first printer unit 10.

Upon connecting the printing-paper supply unit 30 and the first printer unit 10 to each other, the printing-paper supply unit 30 and the first printer unit 10 are electrically connected to each other. At this time, a controller incorporated in the first printer unit 10 controls driving of the first printer unit 10, and also controls driving of the printing-paper supply unit 30.

Further, one of the first-printer housing 10*a* of the first printer unit 10, and the cutter housing 40*a* of the cutter unit 40 is provided with a projection. The other one of the first-printer housing 10*a* of the first printer unit 10, and the cutter housing 40*a* of the cutter unit 40 is provided with a recess for fitting engagement with the projection. Further, one of the first-printer housing 10*a* and the cutter housing 40*a* is provided with a reference component, and the other is provided with a detector that detects the reference component.

One of the cutter housing 40*a* of the cutter unit 40, and the second-printer housing 20*a* of the second printer unit 20 is provided with a projection, and the other is provided with a recess for fitting engagement with the projection. One of the cutter housing 40*a* and the second-printer housing 20*a* is provided with a reference component, and the other is provided with a detector that detects the reference component.

Upon connecting the cutter unit 40 and the first printer unit 10 to each other, the cutter unit 40 and the first printer unit 10 are electrically connected to each other. At this time, the controller incorporated in the first printer unit 10 controls driving of the first printer unit 10, and also controls driving of the cutter unit 40.

As illustrated in FIG. 7, a guide flap 45 is disposed in the first-printer housing 10*a* of the first printer unit 10. The guide flap 45 guides the roll printing paper 3 that has undergone printing in the first printer unit 10 toward the cutter unit 40. More specifically, the guide flap 45 is disposed in the first-printer housing 10*a* in a swingable manner. The guide flap 45 assumes either a transport position or a release position. In the transport position, the guide flap 45 sends the roll printing paper 3 that has received printing in the first printer unit 10 toward the cutter 41 of the cutter unit 40. In the release position, the guide flap 45 releases the roll printing paper 3 outward away from the cutter 41 of the cutter unit 40.

A paper-connecting plate 46 is disposed in the cutter housing 40*a* of the cutter unit 40. The paper-connecting plate 46 transports the sheet printing paper 2 obtained by cutting the roll printing paper 3 in the cutter unit 40 toward the second printer unit 20. The paper-connecting plate 46 swings within the cutter housing 40*a* when a push-out mechanism provided to the second printer unit 20 comes into contact with the paper-connecting plate 46.

The paper-connecting plate 46 includes a paper-connecting plate body 46*a*, and a proximal end portion 46*b* disposed at the proximal end of the paper-connecting plate body 46*a*. The paper-connecting plate body 46*a* of the paper-connecting plate 46 is mounted to the cutter housing 40*a* in a manner that allows the paper-connecting plate body 46*a* to swing about a pivot shaft 46*c* as illustrated in FIG. 15.

The second-printer housing 20*a* of the second printer unit 20 is provided with a pair of left and right push-out mechanisms with different shapes respectively located at the left and right of the second-printer housing 20*a*. More specifically, for example, the second-printer housing 20*a* is provided with a pair of push-out pins 61 and 62. The push-out pins 61 and 62 project toward the cutter unit 40 by different lengths (see FIG. 15).

The second printer unit 20 placed in an inverted position is connected via the cutter unit 40 to the first printer unit 10 placed in a normal position. In this case, the shorter push-out pin, the push-out pin 61, of the second printer unit 20 is positioned in contact with the proximal end portion 46*b* of the paper-connecting plate 46, and the longer push-out pin, the push-out pin 62, is positioned away from the proximal end portion 46*b*. In this case, the paper-connecting plate body 46*a* swings about 45 degrees from a position in which the paper-connecting plate body 46*a* is oriented vertically downward. At this time, the paper-connecting plate 46 does not serve to transport the sheet printing paper 2, and assumes a standby position (a position indicated by solid lines in FIG. 15). With the paper-connecting plate 46 swinging by about 45 degrees and assuming the standby position, the paper-connecting plate 46 does not interfere with the feed roller 25 of the second printer unit 20.

In another exemplary configuration, the second printer unit 20 placed in a normal position is connected via the cutter unit 40 to the first printer unit 10 placed in a normal position as will be described later (see FIG. 8). In this case, the push-out pins 61 and 62 of the second printer unit 20 are swapped left to right. In this case, the longer push-out pin, the push-out pin 62, of the second printer unit 20 is positioned in contact with the proximal end portion 46*b* of the paper-connecting plate 46, and the shorter push-out pin, the push-out pin 61, is positioned away from the proximal end portion 46*b*. In this case, the paper-connecting plate body 46*a* swings about 90 degrees into a horizontal position from a position in which the paper-connecting plate body 46*a* is oriented vertically downward. At this time, the paper-connecting plate 46 assumes a transport position (a position indicated by dashed lines in FIG. 15) in which the paper-connecting plate 46 transports the sheet printing paper 2 toward the second printer unit 20.

Reference is now made to FIG. 7 to describe operation of the third embodiment configured as described above.

First, as illustrated in FIG. 7, the first printer unit 10 and the second printer unit 20 that are independent of each other and identical to each other in structure, the printing-paper supply unit 30, and the cutter unit 40 are prepared. Subsequently, the first printer unit 10 placed in a normal position is connected to the printing-paper supply unit 30. The second printer unit 20 placed in an inverted position is then connected to the first printer unit 10 via the cutter unit 40. The printer system 1 according to the third embodiment is thus obtained.

Subsequently, as illustrated in FIG. 7, the roll printing paper 3 is sent from the printing-paper supply unit 30 toward the first printer unit 10.

The roll printing paper 3 sent to the first printer unit 10 sequentially passes the feed roller 15 and the additional feed roller 15*a*, and then the pinch roller 16 and the grip roller 17. The roll printing paper 3 is then sent to the location between the first thermal head 13 and the first platen roller 14.

Subsequently, the ink ribbon 19 is sent to the location between the first thermal head 13 and the first platen roller 14 from the ink ribbon supply part 11. In this case, the first thermal head 13 faces one side, the top side, of the roll printing paper 3. The ink ribbon 19 has the colors yellow, magenta, and cyan, and an overcoat layer.

The roll printing paper 3 and the ink ribbon 19 are then held between the first thermal head 13 and the first platen roller 14. The roll printing paper 3 is then retracted toward the printing-paper supply unit 30, and the ink ribbon 19 is heated and pressed against the roll printing paper 3 by the first thermal head 13. In this way, the colors yellow, magenta, and cyan on the ink ribbon 19 are thermally transferred by the first thermal head 13 onto the roll printing paper 3 through a dye-sublimation process. Further, the overcoat layer is thermally transferred and printed onto the roll printing paper 3 on which these colors have been thermally transferred.

As described above, the ink ribbon 19 is heated and pressed against the roll printing paper 3 by the first thermal head 13. As a result, the colors yellow, magenta, and cyan, and the overcoat layer are thermally transferred and printed onto the top side of the roll printing paper 3.

Meanwhile, in sending the roll printing paper 3 from the printing-paper supply unit 30 toward the first printer unit 10, the leading edge of the roll printing paper 3 projects toward the cutter unit 40 via the delivery rollers 18*a* and 18*b*.

At this time, the guide flap 45 of the first printer unit 10 has swung into a release position in which an end portion of the guide flap 45 near the first thermal head 13 is oriented upward. This ensures that the leading edge of the roll printing paper 3 sent from the printing-paper supply unit 30 toward the first printer unit 10 is not transported to the cutter 41 of the cutter unit 40. The roll printing paper 3 is guided downward by the guide flap 45, such that the roll printing paper 3 is released downward (moved downward) away from the cutter 41.

Thereafter, the guide flap 45 of the first printer unit 10 swings into a transport position in which the guide flap 45 is oriented horizontally.

Subsequently, the roll printing paper 3 printed on its top side by the first printer unit 10 is sent to the cutter unit 40. At this time, an end portion of the roll printing paper 3 is cut by the cutter 41 of the cutter unit 40. Further, the roll printing paper 3 is advanced toward the second printer unit 20, and cut to a specified length to thereby form the sheet printing paper 2.

Further, the sheet printing paper 2 formed by using the cutter 41 of the cutter unit 40 is sent toward the second printer unit 20.

The second printer unit 20 is placed in an inverted position relative to the first printer unit 10 that is placed in a normal position. Consequently, the second thermal head 23 of the second printer unit 20 faces the other side, the bottom side, of the sheet printing paper 2.

Subsequently, the sheet printing paper 2 sent to the second printer unit 20 sequentially passes the feed roller 25, and then the pinch roller 26 and the grip roller 27. The sheet printing paper 2 is then sent to the location between the second thermal head 23 and the second platen roller 24.

Subsequently, the ink ribbon 29 is sent to the location between the second thermal head 23 and the second platen roller 24 from the ink ribbon supply part 21. In this case, the ink ribbon 29 has the colors yellow, magenta, and cyan, and an overcoat layer.

The sheet printing paper 2 and the ink ribbon 29 are then held between the second thermal head 23 and the second platen roller 24. The sheet printing paper 2 is then retracted toward the cutter unit 40, and the ink ribbon 29 is heated and pressed against the sheet printing paper 2 by the second thermal head 23. In this way, the colors yellow, magenta, and cyan on the ink ribbon 29 are thermally transferred by the second thermal head 23 onto the sheet printing paper 2 through a dye-sublimation process. Further, the overcoat layer is thermally transferred and printed onto the sheet printing paper 2 on which these colors have been thermally transferred.

As described above, as the ink ribbon 29 is heated and pressed against the sheet printing paper 2 by the second thermal head 23, the colors yellow, magenta, and cyan, and the overcoat layer are thermally transferred and printed onto the other side, the bottom side, of the sheet printing paper 2.

As described above, according to the third embodiment, the printer system 1 is obtained in an easy and simple manner solely by connecting the first printer unit 10 placed in a normal position to the printing-paper supply unit 30, and then connecting the second printer unit 20 placed in an inverted position to the first printer unit 10 via the cutter unit 40. In this case, the first printer unit 10 of the printer system 1 prints on the top side of the roll printing paper 3. The second printer unit 20 prints on the bottom side of the sheet printing paper 2. In this way, after the roll printing paper 3 is first printed on its top side by the printer system 1, the roll printing paper 3 is cut to form the sheet printing paper 2, which is then printed on its bottom side. As a result, duplex printing is performed on the sheet printing paper 2 by using the roll printing paper 3. In this case, the printer system 1 does not need to incorporate a complicated printing-paper reversing mechanism to perform duplex printing. As a result, the printer system 1 is simplified in overall structure.

In connecting the printing-paper supply unit 30, the first printer unit 10, the cutter unit 40, and the second printer unit 20 to each other, the projection and the recess, which are each provided to the printing-paper supply housing 30*a*, the first-printer housing 10*a*, the cutter housing 40*a*, or the second-printer housing 20*a*, are brought into fitting engagement with each other. This makes it possible to connect the printing-paper supply unit 30, the first printer unit 10, the cutter unit 40, and the second printer unit 20 with ease and at the correct position.

Furthermore, the reference component provided to the printing-paper supply housing 30*a*, the first-printer housing 10*a*, the cutter housing 40*a*, or the second-printer housing 20*a* is detected by the corresponding detector. This makes it possible to detect whether the printing-paper supply unit 30, the first printer unit 10, the cutter unit 40, and the second printer unit 20 have been connected to each other at the correct position.

Furthermore, in sending the roll printing paper from the printing-paper supply unit 30 toward the first printer unit 10, the leading edge of the roll printing paper 3 is released downward away from the cutter 41 by means of the guide flap 45 that is assuming a release position. This ensures that the roll printing paper 3 sent from the printing-paper supply unit 30 toward the first printer unit 10 does not interfere with the sheet printing paper 2 existing in the cutter unit 40 or in the second printer unit 20.

Fourth Embodiment

Reference is now made to FIGS. 8 to 14 to describe a fourth embodiment.

According to the fourth embodiment illustrated in FIGS. 8 to 14, a printer system 1 includes a printing-paper supply unit 30, a first printer unit 10 placed in a normal position, and a second printer unit 20 placed in a normal position and connected to the first printer unit 10 via the cutter unit 40. The fourth embodiment is otherwise substantially identical in structure to the third embodiment illustrated in FIGS. 7 and 15.

According to the fourth embodiment in FIGS. 8 to 14, the ink ribbon 19 of the first printer unit 10 has the colors yellow, magenta, and cyan, and an overcoat layer. The ink ribbon 29 of the second printer unit 20 has special colors such as hologram and pearl.

Features of the fourth embodiment in FIGS. 8 to 14 identical to those of the third embodiment in FIGS. 7 and 15 are denoted by the same reference signs and not described in further detail.

Reference is now made to operation of the fourth embodiment configured as illustrated in FIGS. 8 to 14.

First, as illustrated in FIGS. 8 to 14, the first printer unit 10 and the second printer unit 20 that are independent of each other and identical to each other in structure, the printing-paper supply unit 30, and the cutter unit 40 are prepared. Subsequently, the first printer unit 10 placed in a normal position is connected to the printing-paper supply unit 30. The second printer unit 20 placed in a normal position is then connected to the first printer unit 10 via the cutter unit 40. The printer system 1 according to the fourth embodiment is thus obtained.

In this case, the second printer unit 20 placed in a normal position is connected via the cutter unit 40 to the first printer unit 10 placed in a normal position. The push-out pins 61 and 62 of the second printer unit 20 are thus swapped left to right. Consequently, the longer push-out pin, the push-out pin 62, of the second printer unit 20 is positioned in contact with the proximal end portion **46*b* of the paper-connecting plate 46, and the shorter push-out pin, the push-out pin 61, is positioned away from the proximal end portion 46*b*. In this case, the paper-connecting plate body 46*a* swings about 90 degrees into a horizontal position from a position in which the paper-connecting plate body 46*a* is oriented vertically downward. The paper-connecting plate 46 thus assumes a transport position (a position indicated by dashed lines in FIGS. 9 and 15) in which the paper-connecting plate 46 transports the sheet printing paper 2 toward the second printer unit 20**.

Subsequently, as illustrated in FIGS. 8 to 14, the roll printing paper 3 is sent from the printing-paper supply unit 30 toward the first printer unit 10.

The roll printing paper 3 sent to the first printer unit 10 sequentially passes the feed roller 15 and the additional feed roller **15*a*, and then the pinch roller 16 and the grip roller 17. The roll printing paper 3 is then sent to the location between the first thermal head 13 and the first platen roller 14**.

Subsequently, the ink ribbon 19 is sent to the location between the first thermal head 13 and the first platen roller 14 from the ink ribbon supply part 11. In this case, the first thermal head 13 faces one side, the top side, of the roll printing paper 3. The ink ribbon 19 has the colors yellow, magenta, and cyan, and an overcoat layer.

The roll printing paper 3 and the ink ribbon 19 are then held between the first thermal head 13 and the first platen roller 14. With the roll printing paper 3 being retracted toward the printing-paper supply unit 30, the ink ribbon 19 is heated and pressed against the roll printing paper 3 by the first thermal head 13. In this way, the colors yellow, magenta, and cyan on the ink ribbon 19 are thermally transferred by the first thermal head 13 onto the roll printing paper 3 through a dye-sublimation process. Further, the overcoat layer is thermally transferred and printed through a dye-sublimation process onto the roll printing paper 3 on which these colors have been thermally transferred.

As described above, the ink ribbon 19 is heated and pressed against the roll printing paper 3 by the first thermal head 13. As a result, the colors yellow, magenta, and cyan, and the overcoat layer are thermally transferred and printed through a dye-sublimation process onto the top side of the roll printing paper 3.

Figure 8:
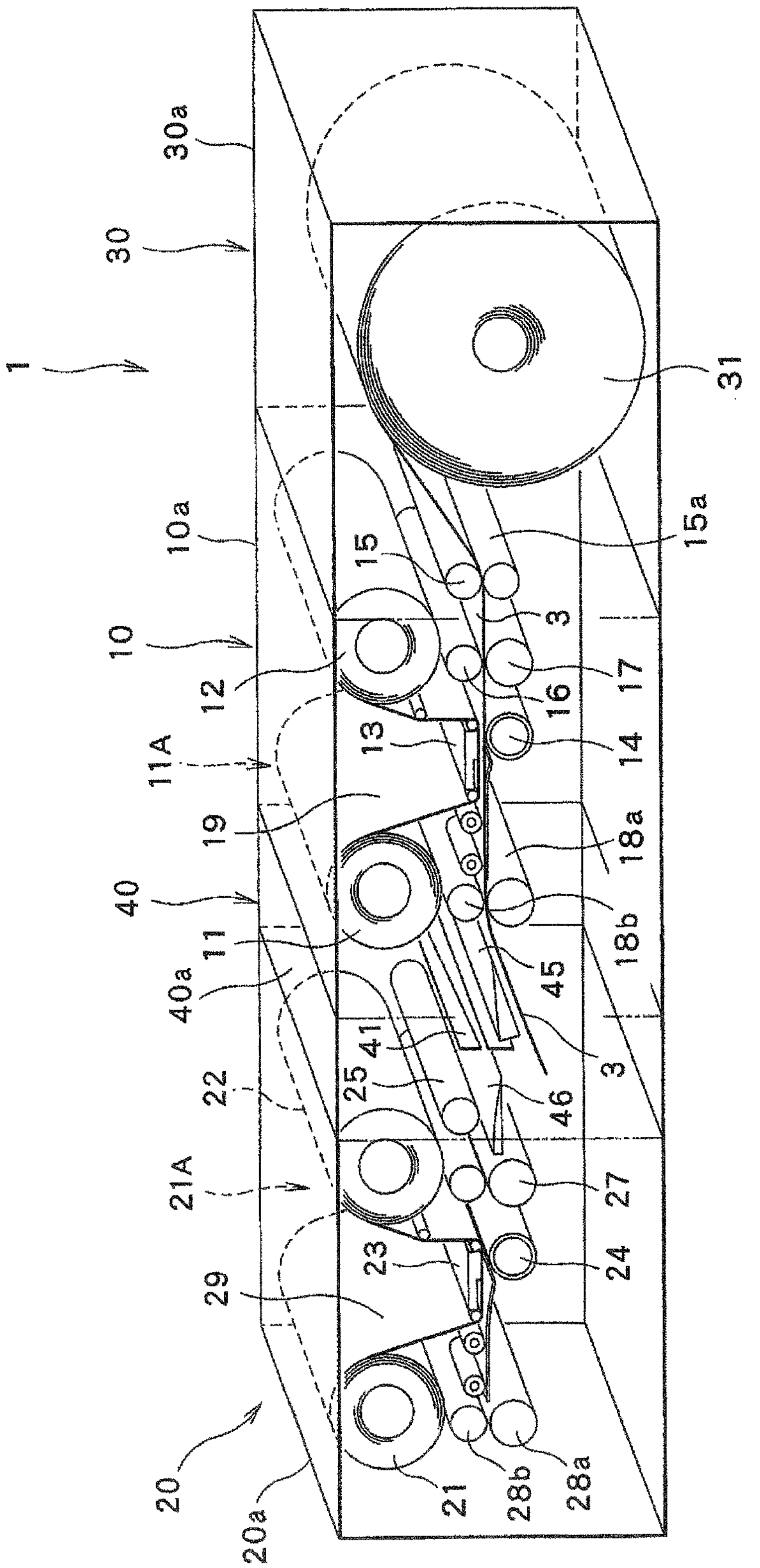
FIG. 8 is a schematic perspective view of a printer system according to a fourth embodiment.
Figure 9:
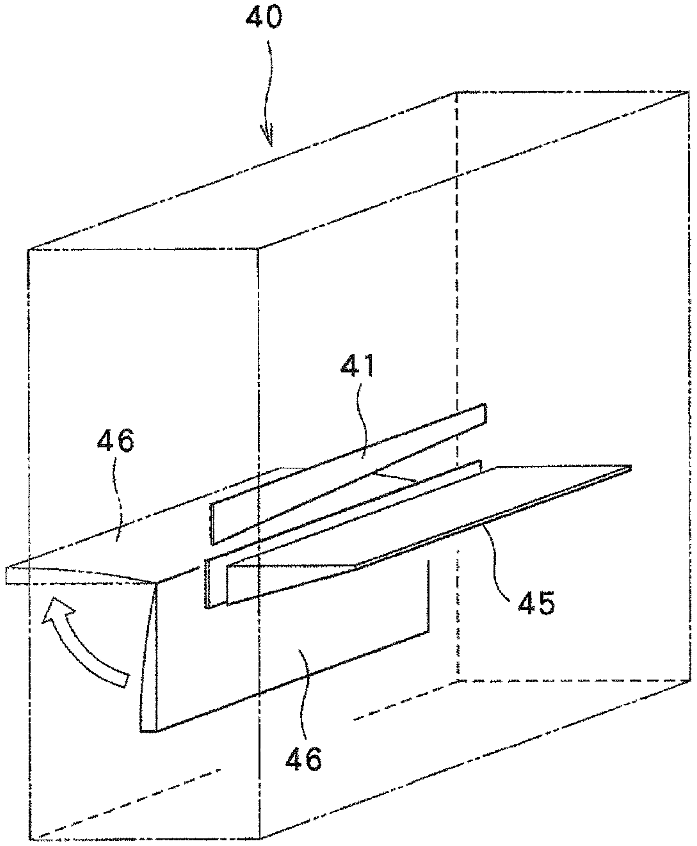
FIG. 9 is a detail illustration of a cutter unit of the printer system according to the fourth embodiment.
Figure 10:
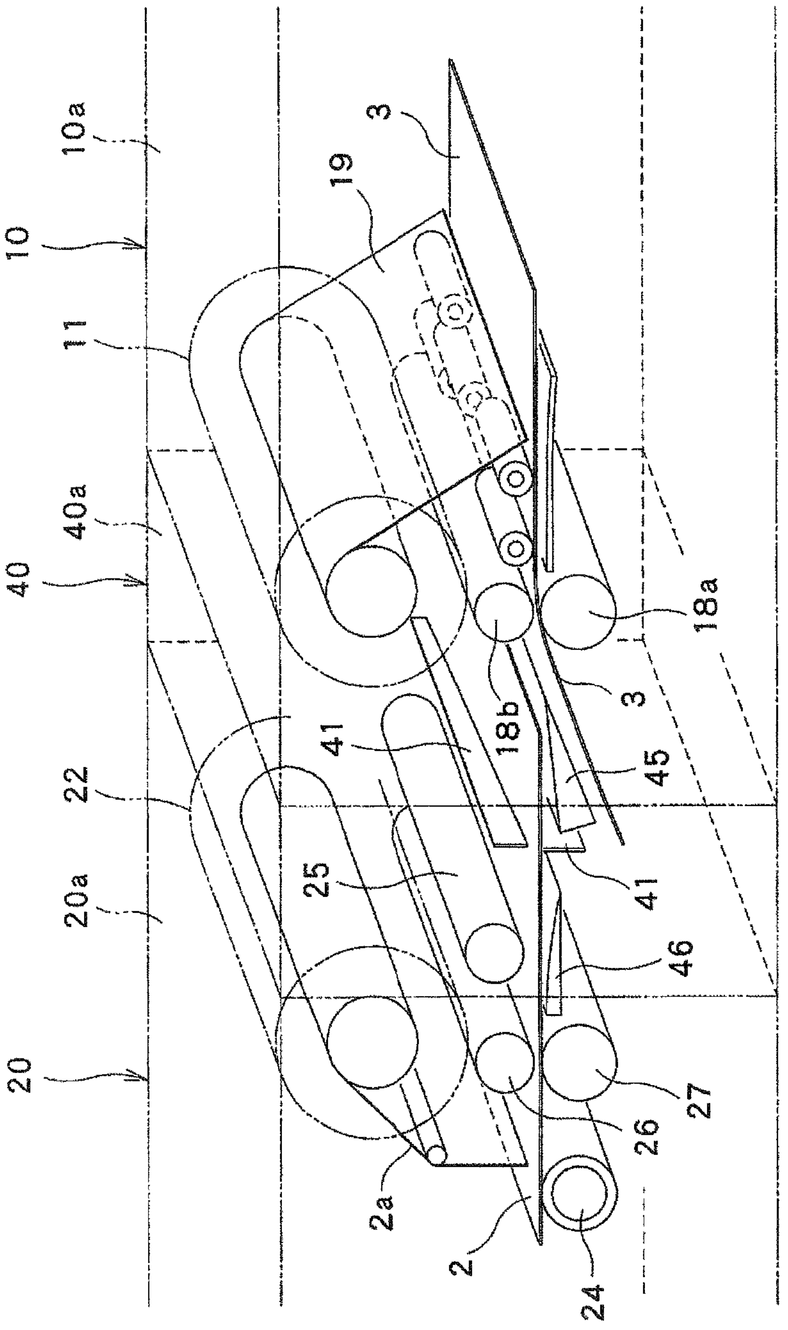
FIG. 10 is a detail illustration of a first printer unit, a second printer unit, and the cutter unit of the printer system according to the fourth embodiment.

Meanwhile, in sending the roll printing paper 3 from the printing-paper supply unit 30 toward the first printer unit 10, the leading edge of the roll printing paper 3 projects toward the cutter unit 40 via the delivery rollers **18*a* and 18*b* (see FIGS. 8 and 10**).

At this time, the guide flap 45 of the first printer unit 10 has swung into a release position in which an end portion of the guide flap 45 near the first thermal head 13 is oriented upward. This ensures that the leading edge of the roll printing paper 3 sent from the printing-paper supply unit 30 toward the first printer unit 10 is not transported to the cutter 41 of the cutter unit 40. The roll printing paper 3 is guided downward by the guide flap 45, such that the roll printing paper 3 is released downward away from the cutter 41 (see FIG. 14).

Figure 11:
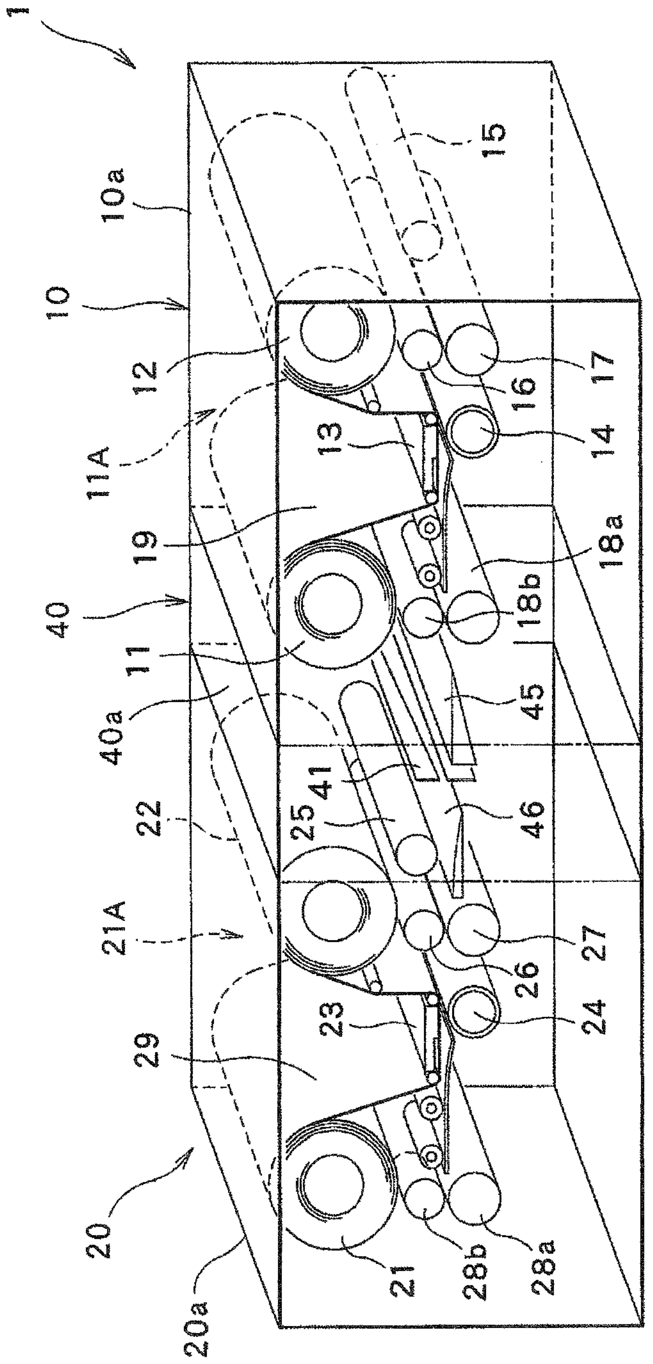
FIG. 11 illustrates operation of the printer system according to the fourth embodiment.

Thereafter, the guide flap 45 of the first printer unit 10 swings into a transport position in which the guide flap 45 is oriented horizontally (see FIG. 11).

Figure 12:
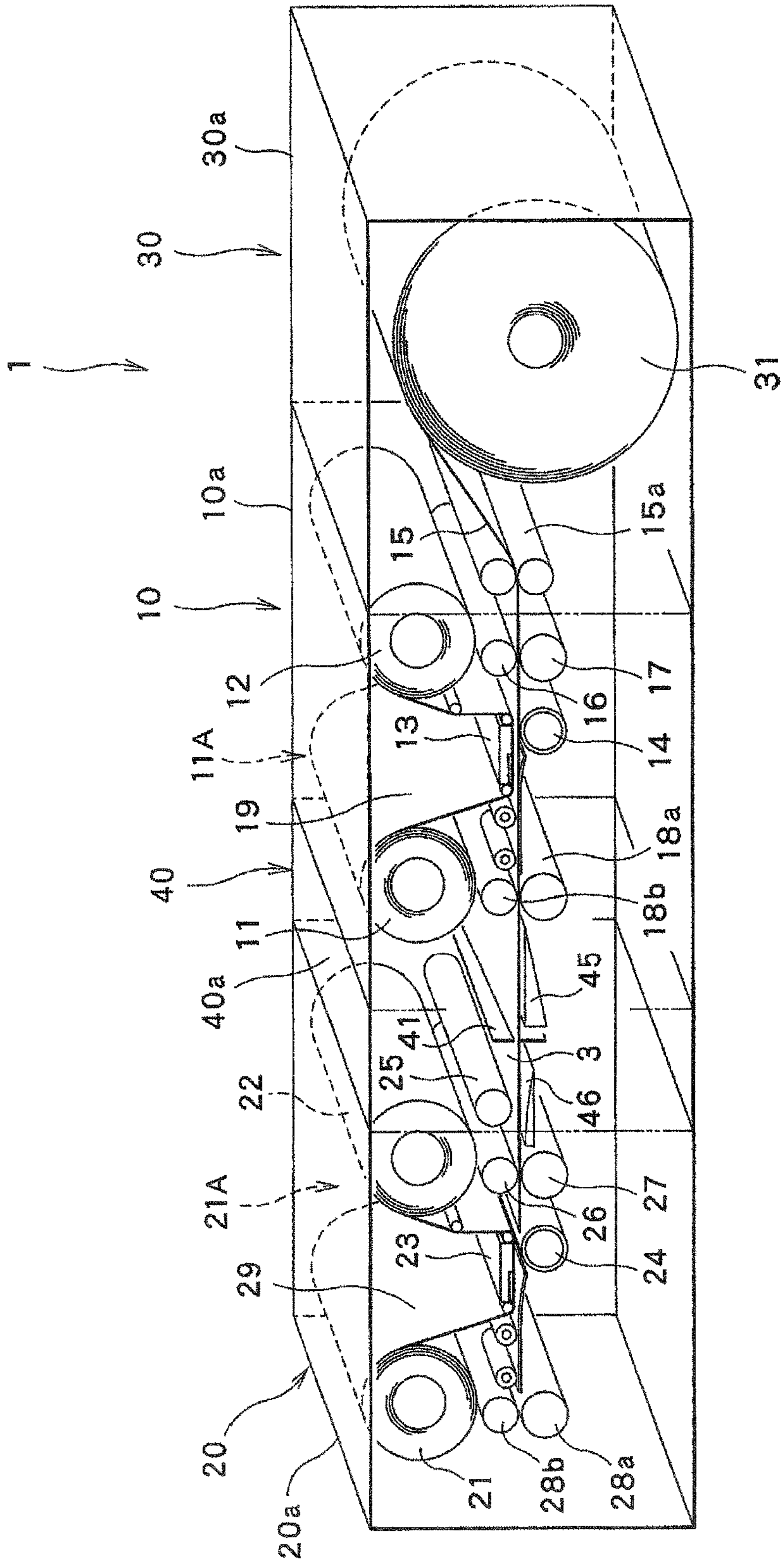
FIG. 12 illustrates operation of the printer system according to the fourth embodiment.

Subsequently, the roll printing paper 3 printed on its top side by the first printer unit 10 is sent to the cutter unit 40 (see FIG. 12). An end portion of the roll printing paper 3 is then cut by the cutter 41 of the cutter unit 40. Further, the roll printing paper 3 is advanced toward the second printer unit 20, and cut to a specified length to thereby create the sheet printing paper 2.

Figure 13:
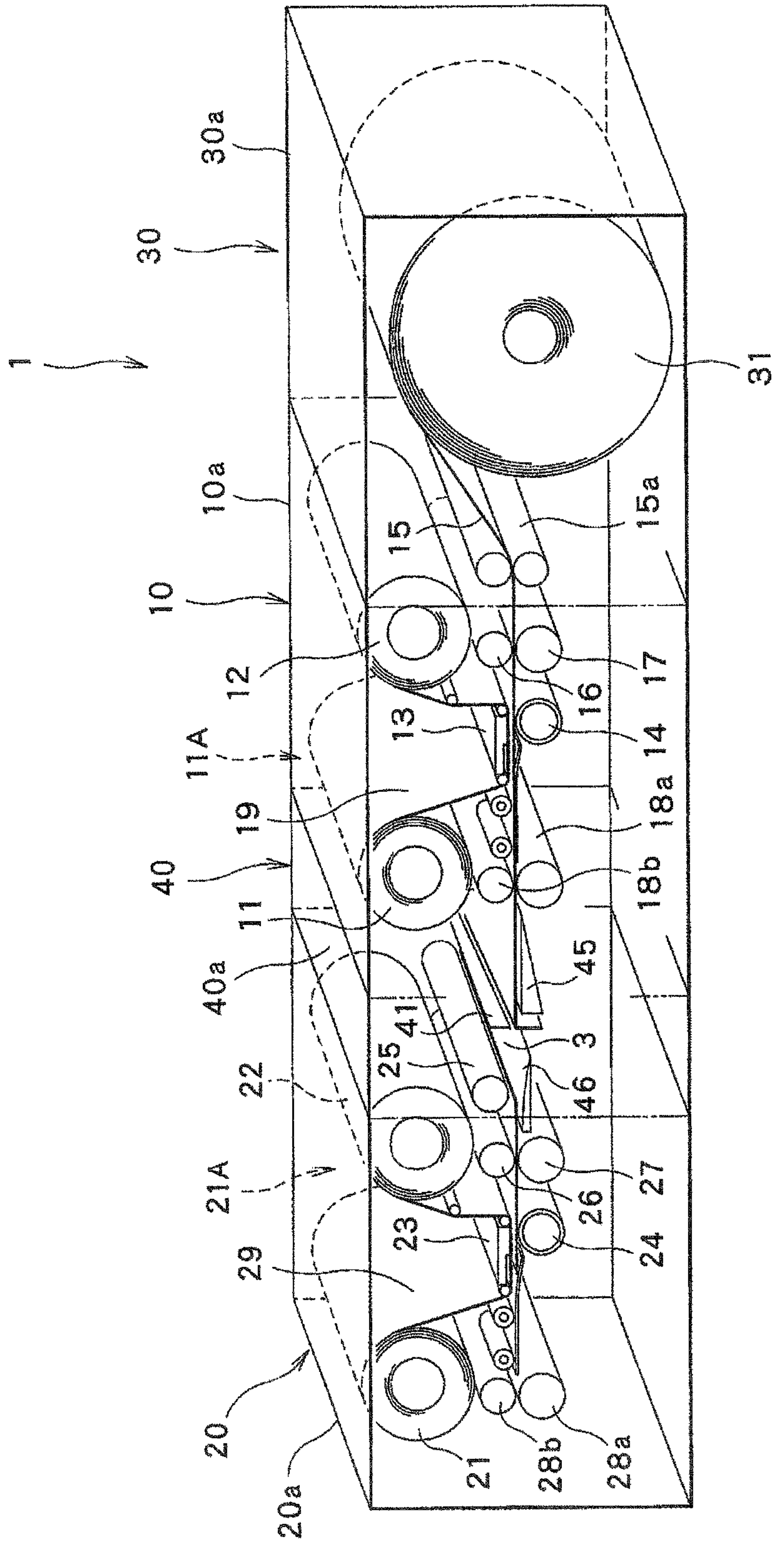
FIG. 13 illustrates operation of the printer system according to the fourth embodiment.
Figure 14:
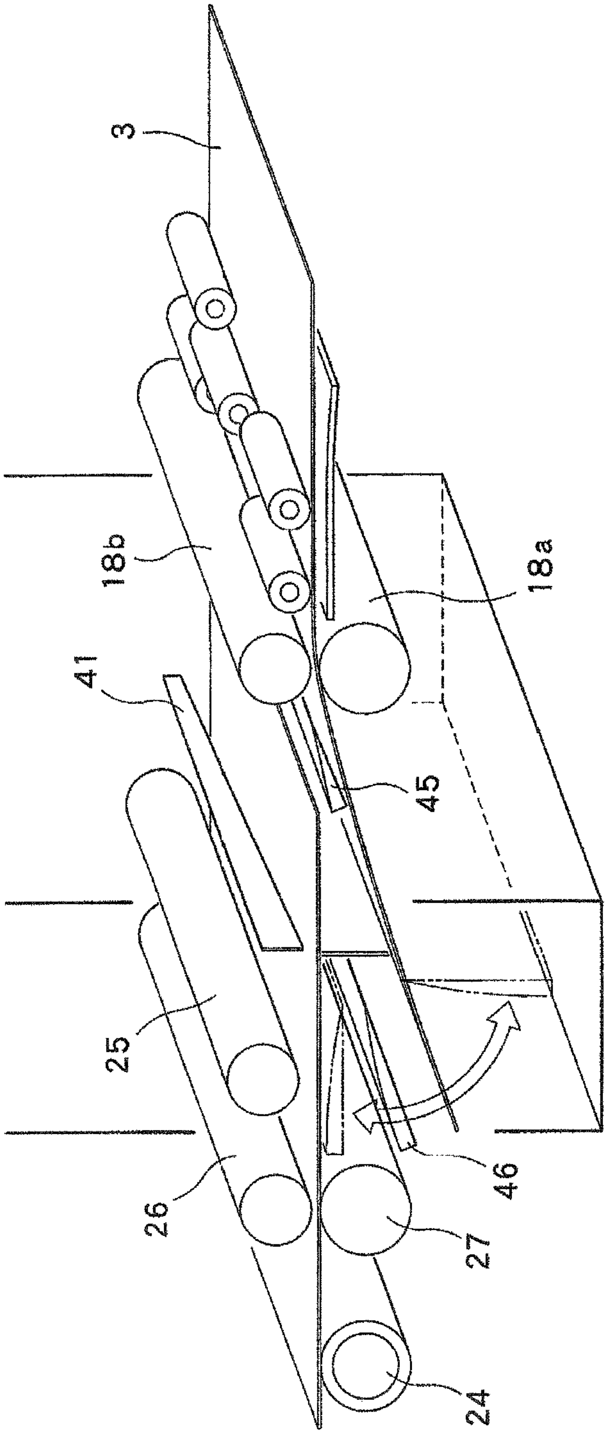
FIG. 14 is a detail illustration of a paper-connecting plate and a guide flap.

Further, as illustrated in FIG. 13, the sheet printing paper 2 formed by using the cutter 41 of the cutter unit 40 is sent toward the second printer unit 20.

The roll printing paper 3 cut by the cutter 41 is retracted toward the first printer unit 10.

Meanwhile, the paper-connecting plate 46 provided to the cutter unit 40 is assuming a transport position in which the paper-connecting plate 46 is oriented horizontally. As a result, the sheet printing paper 2 formed by using the cutter unit 40 can be transported by the paper-connecting plate 46 assuming a horizontal position (a position indicated by dashed lines in FIGS. 9 and 15) toward the second printer unit 20 in a reliable and stable manner.

As with the first printer unit 10 placed in a normal position, the second printer unit 20 is placed in a normal position. This means that the second thermal head 23 of the second printer unit 20 faces one side, the top side, of the sheet printing paper 2.

Subsequently, the sheet printing paper 2 sent to the second printer unit 20 sequentially passes the feed roller 25, and then the pinch roller 26 and the grip roller 27. The sheet printing paper 2 is then sent to the location between the second thermal head 23 and the second platen roller 24.

Subsequently, the ink ribbon 29 is sent to the location between the second thermal head 23 and the second platen roller 24 from the ink ribbon supply part 21.

The sheet printing paper 2 and the ink ribbon 29 are then held between the second thermal head 23 and the second platen roller 24. The sheet printing paper 2 is then retracted toward the cutter unit 40, and the ink ribbon 29 is heated and pressed against the sheet printing paper 2 by the second thermal head 23. In this way, the special colors such as hologram and pearl on the ink ribbon 29 are thermally transferred by the second thermal head 23 onto the sheet printing paper 2.

As described above, as the ink ribbon 29 is heated and pressed against the sheet printing paper 2 by the second thermal head 23, the colors yellow, magenta, and cyan, and the overcoat layer are thermally transferred onto the top side of the sheet printing paper 2. Further, in addition to the colors yellow, magenta, and cyan, and the overcoat layer, special colors such as hologram and pearl are thermally transferred and printed onto the sheet printing paper 2.

As described above, according to the fourth embodiment, the first printer unit 10 placed in a normal position is connected to the printing-paper supply unit 30. Then, the second printer unit 20 that is likewise placed in a normal position is connected via the cutter unit 40 to the first printer unit 10. The printer system 1 is thus obtained in an easy and simple manner. The colors yellow, magenta, and cyan, and the overcoat layer are thermally transferred and printed by the first printer unit 10 of the printer system 1 onto the top side of the roll printing paper 3. Further, special colors such as hologram and pearl are thermally transferred and printed by the second printer unit 20 onto the top side of the sheet printing paper 2. In this way, after the roll printing paper 3 is first printed on its top side by the printer system 1, the roll printing paper 3 is cut to form the sheet printing paper 2. The sheet printing paper 2 is then printed on its top side. In this way, the colors yellow, magenta, and cyan, and the overcoat layer are thermally transferred by using the roll printing paper 3. Further, special colors are thermally transferred onto the top side of the sheet printing paper 2 obtained by cutting the roll printing paper 3. In this way, dual-head printing is performed. Consequently, the printer system 1 does not need to incorporate a complicated dual-head mechanism to perform dual-head printing. As a result, the printer system 1 is simplified in overall structure.

In connecting the printing-paper supply unit 30, the first printer unit 10, the cutter unit 40, and the second printer unit 20 to each other, the projection and the recess, which are each provided to the printing-paper supply housing 30*a*, the first-printer housing 10*a*, the cutter housing 40*a*, or the second-printer housing 20*a*, are brought into fitting engagement with each other. This makes it possible to connect the printing-paper supply unit 30, the first printer unit 10, the cutter unit 40, and the second printer unit 20 with ease and at the correct position.

Furthermore, the reference component provided to the printing-paper supply housing 30*a*, the first-printer housing 10*a*, the cutter housing 40*a*, or the second-printer housing 20*a* is detected by the corresponding detector. This makes it possible to detect whether the printing-paper supply unit 30, the first printer unit 10, the cutter unit 40, and the second printer unit 20 have been connected to each other at the correct position.

Furthermore, in sending the roll printing paper 3 from the printing-paper supply unit 30 toward the first printer unit 10, the leading edge of the roll printing paper 3 is released downward away from the cutter 41 by means of the guide flap 45 that is assuming a release position. This ensures that the roll printing paper 3 sent from the printing-paper supply unit 30 toward the first printer unit 10 does not interfere with the sheet printing paper 2 existing in the cutter unit 40 or in the second printer unit 20.

REFERENCE SIGNS LIST

1 printer system
2 sheet printing paper
3 roll printing paper
7 sheet-printing-paper supply part
10 first printer unit
10*a* first-printer housing
13 first thermal head
20 second printer unit
20*a* second-printer housing
23 second thermal head
30 printing-paper supply unit
30*a* printing-paper supply housing
31 roll-printing-paper supply part
40 cutter unit
40*a* cutter housing
41 cutter
45 guide flap
46 paper-connecting plate

The invention claimed is:

1. A printer system comprising:

a first printer unit that prints on a printing paper, the first printer unit having a first-printer housing and a first thermal transfer part disposed in the first-printer housing; and a second printer unit that prints on the printing paper, the second printer unit having a second-printer housing and a second thermal transfer part disposed in the second-printer housing, wherein the first printer unit and the second printer unit are independent of each other and capable of connecting to each other, and the printing paper printed on by the first printer unit is sent to the second printer unit and then continuously printed on by the second printer unit, wherein the first thermal transfer part of the first printer unit faces one side of the printing paper, and the second thermal transfer part of the second printer unit faces another side of the printing paper, and wherein the second printer unit is connected to the first printer unit in an inverted position.

2. The printer system according to claim 1, wherein the first printer unit and the second printer unit are identical to each other in structure.

3. The printer system according to claim 1, wherein a sheet-printing-paper supply part that supplies a sheet printing paper is connected upstream of the first printer unit.

4. The printer system according to claim 1, wherein a printing-paper supply unit is connected upstream of the first printer unit, the printing-paper supply unit including a printing-paper supply housing and a roll-printing-paper supply part, the roll-printing-paper supply part being disposed in the printing-paper supply housing to supply a roll printing paper.

5. The printer system according to claim 4, wherein the first printer unit and the second printer unit are connected to each other via a cutter unit, the cutter unit including a cutter housing and a cutter disposed in the cutter housing, the cutter being capable of cutting the roll printing paper to create a sheet printing paper.

6. The printer system according to claim 5, wherein a guide flap that guides the roll printing paper printed on by the first printer unit is disposed near an exit of the first printer unit, the guide flap being capable of assuming a transport position or a release position, the transport position being a position in which the guide flap sends the roll printing paper toward the cutter of the cutter unit, the release position being a position in which the guide flap releases the roll printer paper outward away from the cutter of the cutter unit.

7. The printer system according to claim 5, wherein the cutter unit includes a paper-connecting plate that transports the cut sheet printing paper to the second printer unit.

8. The printer system according to claim 7, wherein the paper-connecting plate is capable of being swung by a push-out mechanism, the push-out mechanism being provided to the second printer unit and capable of coming into contact with the paper-connecting plate, the paper-connecting plate being capable of assuming a transport position or a standby position, the transport position being a position in which the paper-connecting plate transports the sheet printing paper toward the second printer unit, the standby position being a position in which the paper-connecting plate does not allow the sheet printing paper to be transported toward the second printer unit.

9. The printer system according to claim 8, wherein the second printer unit includes a pair of left and right push-out mechanisms with different shapes, and when the second printer unit is placed in a normal position, one of the push-out mechanisms comes into contact with the paper-connecting plate to cause the paper-connecting plate to assume the transport position, and when the second printer unit is placed in an inverted position, another one of the push-out mechanisms comes into contact with the paper-connecting plate to cause the paper-connecting plate to assume the standby position.

10. The printer system according to claim 1, wherein at least one of the first printer unit and the second printer unit includes an ink ribbon cassette, the ink ribbon cassette including a cassette body and an ink ribbon assembly accommodated in the cassette body, wherein the ink ribbon assembly includes an ink ribbon supply part, an ink ribbon take-up part, and an ink ribbon extending between the ink ribbon supply part and the ink ribbon take-up part, wherein the cassette body includes an ink-ribbon-supply-part accommodating part and an ink-ribbon-take-up-part accommodating part, the ink-ribbon-supply-part accommodating part accommodating the ink ribbon supply part and having one open side, the ink-ribbon-take-up-part accommodating part accommodating the ink ribbon take-up part and having one open side, and wherein stoppers that engage and lock the ink ribbon supply part and the ink ribbon take-up part in place are disposed at the one open side of the ink-ribbon-supply-part accommodating part, and at the one open side of the ink-ribbon-take-up-part accommodating part.

* * * * *